(12) United States Patent
Yomoda et al.

(10) Patent No.: US 10,183,427 B2
(45) Date of Patent: Jan. 22, 2019

(54) RESIN MOLDING METHOD AND RESIN MOLDING APPARATUS

(71) Applicant: TOYOTA JIDOSHA KABUSHIKI KAISHA, Toyota-shi, Aichi-ken (JP)

(72) Inventors: Hidetoshi Yomoda, Okazaki (JP); Ryo Yokozawa, Toyota (JP)

(73) Assignee: TOYOTA JIDOSHA KABUSHIKI KAISHA, Toyota (JP)

(\*) Notice: Subject to any disclaimer, the term of this patent is extended or adjusted under 35 U.S.C. 154(b) by 262 days.

(21) Appl. No.: 15/058,893

(22) Filed: Mar. 2, 2016

(65) Prior Publication Data

US 2016/0263794 A1 Sep. 15, 2016

(30) Foreign Application Priority Data

Mar. 12, 2015 (JP) ................................. 2015-049152

(51) Int. Cl.
*B28B 7/22* (2006.01)
*B29C 45/02* (2006.01)
(Continued)

(52) U.S. Cl.
CPC ........ *B29C 45/02* (2013.01); *B29C 45/14467* (2013.01); *B29C 45/1671* (2013.01); *H02K 15/02* (2013.01); *B29C 45/0046* (2013.01); *B29C 45/14491* (2013.01); *B29C 45/72* (2013.01); *B29C 2945/76678* (2013.01);
(Continued)

(58) Field of Classification Search
CPC .............. B29C 45/02; B29C 45/14467; B29C 45/1671; B29C 45/0046; B29C 45/14491; B29C 45/72; B29C 2945/76678; B29C 2945/76709; B29C 2945/76816; B29C 45/14; B29C 45/140008; B29C 45/14827; B29C 45/14639; B29C 45/14819; B29C 45/14852; B29C 45/14942; B29C 45/1645; B29C 45/1866; B29C 45/462; B29C 45/53; B29C 70/72; H02K 15/02
See application file for complete search history.

(56) References Cited

U.S. PATENT DOCUMENTS

2010/0110527 A1\* 5/2010 Liu ........................ B81B 3/0081
359/291

FOREIGN PATENT DOCUMENTS

| JP | S6183011 | \* | 4/1986 | ............. B29C 45/02 |
| JP | H04258143 A | \* | 9/1992 | ............. H01L 21/56 |

(Continued)

*Primary Examiner* — William P Bell
*Assistant Examiner* — Andrew L Swanson
(74) *Attorney, Agent, or Firm* — Oliff PLC (57) ABSTRACT

A resin molding method according to the present invention is a resin molding method that fills a space between an insertion hole provided in a workpiece and a member to be fixed inserted into the insertion hole with resin, the method comprising: injecting a first tablet formed of thermosetting resin having a first temperature into a position of a pot far from the workpiece, the pot pouring the resin into the workpiece and being provided in a molding die, injecting a second tablet formed of thermosetting resin having a second temperature higher than the first temperature into a position of the pot close to the workpiece; pouring the thermosetting resin into the insertion hole of the workpiece in an order of the second tablet and the first tablet by a plunger that slides in the pot.

2 Claims, 7 Drawing Sheets

(51) Int. Cl.
  *B29C 45/14* (2006.01)
  *H02K 15/02* (2006.01)
  *B29C 45/16* (2006.01)
  *B29C 45/72* (2006.01)
  *B29C 45/00* (2006.01)

(52) U.S. Cl.
  CPC .............. *B29C 2945/76709* (2013.01); *B29C 2945/76816* (2013.01)

(56) References Cited

FOREIGN PATENT DOCUMENTS

| | | |
|---|---|---|
| JP | H11-136911 A | 5/1999 |
| JP | 2011-067094 A | 3/2011 |

\* cited by examiner

TOP VIEW WHEN MAGNET IS INSERTED INTO MAGNET HOLE
(SCHEMATIC VIEW)

THICK WALL PART   THIN WALL PART   THICK WALL PART

A: HIGH-TEMPERATURE TABLET INJECTED FOR FIRST TIME (70 ° C OR MORE)
B: HIGH-TEMPERATURE TABLET INJECTED FOR SECOND TIME (70 ° C OR MORE)
C: LOW-TEMPERATURE TABLET INJECTED FOR LAST TIME (60 ° C OR MORE)

Fig. 7

RESIN MOLDING METHOD AND RESIN MOLDING APPARATUS

INCORPORATION BY REFERENCE

This application is based upon and claims the benefit of priority from Japanese patent application No. 2015-049152, filed on Mar. 12, 2015, the disclosure of which is incorporated herein in its entirety by reference.

BACKGROUND OF THE INVENTION

1. Field of the Invention

The present invention relates to a resin molding method and a resin molding apparatus, and relates to, for example, a resin molding method and a resin molding apparatus that fill a space between a magnet hole provided in a rotor core of a motor and a magnet body inserted into the magnet hole with resin.

2. Description of Related Art

There is a technique of inserting a member to be fixed (e.g., magnet body) into an insertion hole provided in a workpiece and filling a space between the insertion hole and the member to be fixed with resin to fix the member to be fixed to the inside of the insertion hole. For example, a magnet hole is provided in a rotor core, which is a rotor of a motor, and a permanent magnet is inserted into the magnet hole. At this time, a gap between the magnet hole and the permanent magnet is filled with thermosetting resin to fix the permanent magnet to the inside of the magnet hole. One example of such a resin mold technique is disclosed in the specification of Japanese Patent No. 4865086.

In the method of manufacturing a laminated rotor core disclosed in the specification of Japanese Patent No. 4865086, an upper plate member and a lower plate member are arranged above and below the laminated rotor core, one of the upper plate member and the lower plate member including a resin pot that injects thermosetting resin into the magnet hole, the laminated rotor core is pushed by the upper plate member and the lower plate member from upper and lower sides, thermosetting resin that is melted in the resin pot is pushed out by a plunger, and the magnet hole is filled with thermosetting resin. Further, in the method of manufacturing the laminated rotor core disclosed in the specification of Japanese Patent No. 4865086, the resin pot is formed by its penetration through the upper plate member or the lower plate member where the resin pot is formed at a constant diameter.

In the method of manufacturing the laminated rotor core disclosed in the specification of Japanese Patent No. 4865086, the upper plate member and the lower plate member including the resin pot that substantially close the magnet hole are provided above and below the laminated rotor core. Therefore, when resin is injected into the magnet hole, molten resin discharged from the resin pot enters the magnet hole and is thermally cured, whereby the permanent magnet arranged inside can be fixed to the inside of the magnet hole.

In the technique disclosed in the specification of Japanese Patent No. 4865086, thermosetting resin in the resin pot is pushed out by the plunger to fill the magnet hole with thermosetting resin. The magnet hole starts to be filled with thermosetting resin in a state in which thermosetting resin is heated to an even temperature in the pot. Further, thermosetting resin starts to be cured due to a heat in the magnet hole and the resin pot when it is injected into the magnet hole. Therefore, in the stage in which thermosetting resin which is in a side of the pot far from the workpiece (or a side of the pot close to the plunger) is injected into the magnet hole, the viscosity of thermosetting resin injected into the magnet hole becomes high. Therefore, when the magnet hole is filled with thermosetting resin using the technique disclosed in the specification of Japanese Patent No. 4865086, the magnet hole may not be sufficiently filled with thermosetting resin. A part of the magnet hole having a gap between it and the magnet which is relatively large tends to be filled first with molten resin. There is also a narrow space between the magnet hole and the magnet. Since this narrow space is filled with thermosetting resin at the last stage of the filling process, when the viscosity of molten resin that enters the magnet hole at the last stage is high, hardly any molten resin enters the narrow space.

The present invention has been made in view of the above circumstances and aims to sufficiently fill a narrow space with thermosetting resin.

SUMMARY OF THE INVENTION

One aspect of a resin molding method according to the present invention is a resin molding method that fills a space between an insertion hole provided in a workpiece and a member to be fixed inserted into the insertion hole with resin, the method including: injecting a first tablet formed of thermosetting resin having a first temperature into a position of a pot far from the workpiece, the pot pouring the resin into the workpiece and being provided in a molding die, injecting a second tablet formed of thermosetting resin having a second temperature higher than the first temperature into a position of the pot close to the workpiece; at a stage where the second tablet of the thermosetting resin is melted in the pot, starting push-out by a plunger that slides in the pot and pouring the thermosetting resin into the insertion hole.

Further, as one aspect of the resin molding method according to the present invention, a plurality of tablets formed of thermosetting resin may be prepared to satisfy the temperature of the first tablet<the temperature of the second tablet<the temperature of the third tablet, the first tablet, the second tablet, and the third tablet may be injected into the pot in this order, push-out by the plunger may be started when the third tablet is melted to pour melt thermosetting resin into the insertion hole of the workpiece in the order of the third tablet, the second tablet, and the first tablet. Note that four or more different kinds of tablets may be used.

One aspect of a resin molding apparatus according to the present invention is a resin molding apparatus that fills a space between an insertion hole provided in a workpiece and a member to be fixed inserted into the insertion hole with resin, the apparatus including: a molding die including a pot into which a resin tablet formed of thermosetting resin is injected; a plunger slide controller that controls a plunger sliding in the pot; a clamping die that pushes the workpiece against the molding die; a clamping die slide controller that slides the clamping die; a first tablet heating part that heats the resin tablet to a first temperature; a second tablet heating part that heats the resin tablet to a second temperature higher than the first temperature; a transport mechanism that transports a first tablet heated by the first tablet heating part, a second tablet heated by the second tablet heating part, and the workpiece to the molding die; and a resin mold controller that controls the plunger slide controller, the clamping die slide controller, and the transport mechanism, in which: the resin mold controller instructs the transport mechanism to inject the first tablet and the second tablet into the pot in such a way that the second tablet is positioned closer to the workpiece than the first tablet is in the pot, the resin mold controller instructs the transport mechanism to provide the workpiece in the molding die after the first tablet and the second tablet are injected into the pot, the resin mold controller instructs the clamping die slide controller to push the workpiece against the molding die after the workpiece is provided in the molding die, and the resin mold controller instructs the plunger slide controller to push out, after the workpiece is pushed against the molding die, the plunger to pour the thermosetting resin into the insertion hole of the workpiece.

According to the resin molding method and the resin molding apparatus according to the present invention, the first tablet having a low temperature is injected into a position far from the workpiece in the pot and the second tablet having a high temperature is injected into a position close to the workpiece in the pot. Accordingly, the viscosity of the melt thermosetting resin forming the first tablet can be kept relatively low when thermosetting resin of the first tablet whose temperature is lower than that of the second tablet is injected into the insertion hole to be filled with resin after melt thermosetting resin forming the second tablet is injected into the insertion hole to be filled with resin. That is, it is possible to prevent a situation in which thermosetting resin to be injected into the insertion hole later starts to be thermally cured and the insertion hole is filled with thermosetting resin having a high viscosity. Therefore, thermosetting resin which is melted easily reaches a narrow space in the insertion hole.

According to the resin molding method and the resin molding apparatus according to the present invention, it is possible to increase the accuracy with which the insertion hole is filled with resin.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Hereinafter, with reference to the drawings, embodiments of the present invention will be described. For the clarification of the description, the following description and the drawings are omitted and simplified as appropriate. Throughout the drawings, the same reference symbols are given to the same elements and overlapping descriptions are omitted as appropriate.

In a resin molding method and a resin molding apparatus according to a first embodiment, a space between an insertion hole provided in a workpiece and a member to be fixed inserted into the insertion hole is filled with resin. In the embodiment described below, a description will be given of a rotor core of a motor as one example of the workpiece which is to be filled with resin. The present invention is applicable not only to the rotor core but also to any element that fixes the member to be fixed to the inside of the insertion hole by filling a space between the insertion hole and the member to be fixed with resin. Further, in the following description, an example in which the magnet hole provided in the rotor core is the insertion hole and the magnet is used as the member to be fixed will be described.

Figure 1:
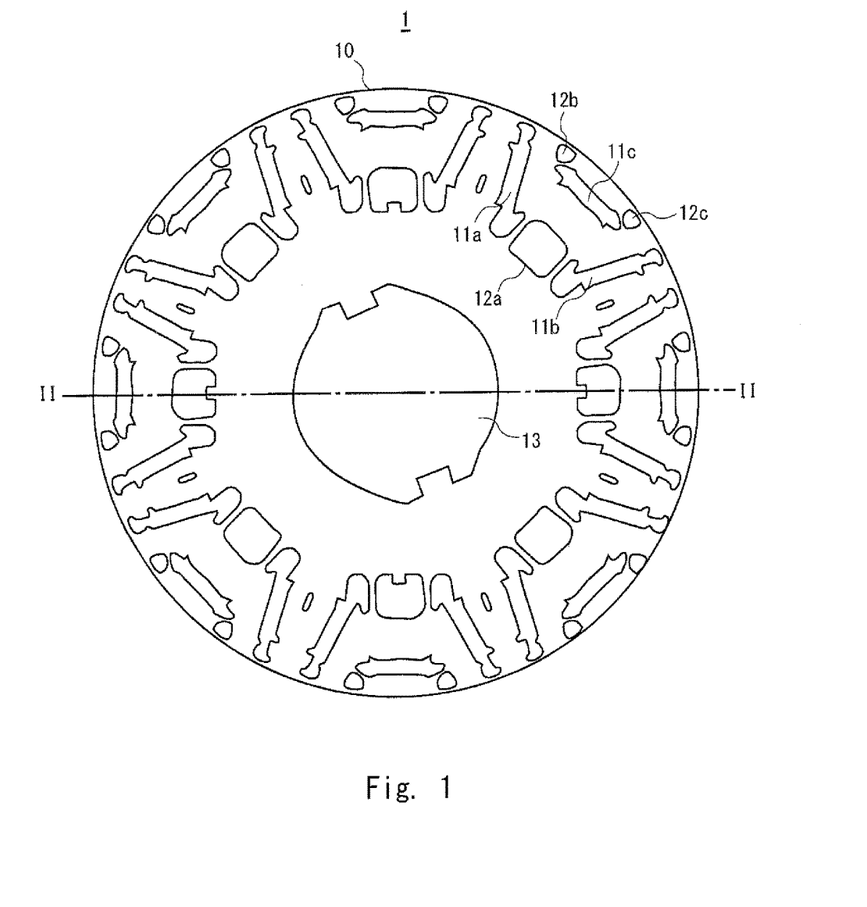
FIG. 1 is a top view of a rotor core according to a first embodiment.

First, FIG. 1 shows a top view of a rotor core 1 according to the first embodiment. The rotor core 1 shown in FIG. 1 includes laminated steel plates 10 that are laminated in the depth direction of the drawing of FIG. 1. As shown in FIG. 1, the laminated steel plates 10 include magnet holes 11a to 11c, gap holes 12a to 12c, and a shaft hole 13. The laminated steel plates 10 are formed so that holes of the laminated steel plates 10 overlap in the laminating direction. That is, the holes of the laminated steel plates 10 are connected to one another in the laminating direction. Further, in the laminated steel plates 10, eight sets each respectively including magnet holes 11a to 11c and gap holes 12a to 12c are formed.

Magnets are inserted into the magnet holes 11a to 11c in a later process. The gap holes 12a to 12c are provided to interrupt a magnetic flux between neighboring magnets. The shaft hole 13 is a hole through which a rotary shaft is inserted.

Figure 2:
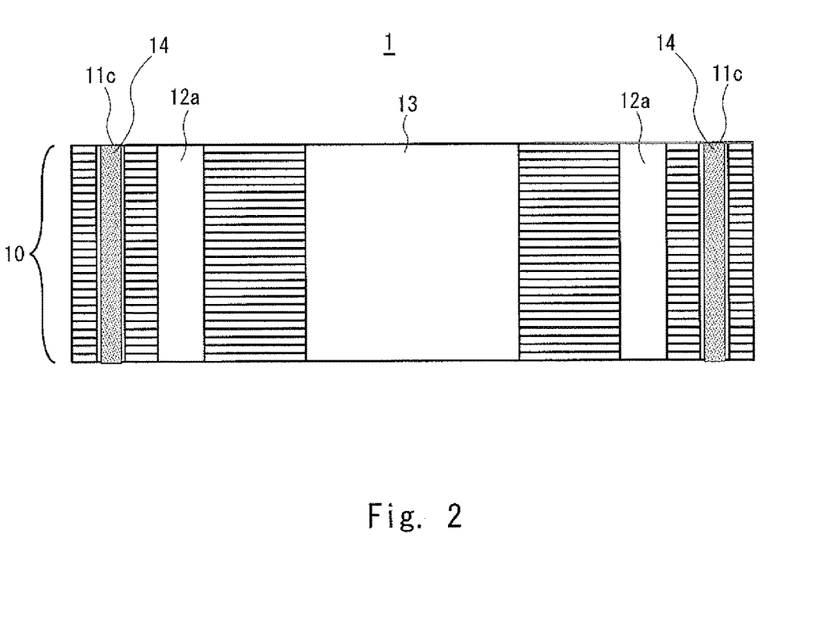
FIG. 2 is a cross-sectional view of the rotor core according to the first embodiment.

FIG. 2 shows a cross-sectional view of the rotor core 1 taken along the line of FIG. 1. As shown in FIG. 2, the laminated steel plates 10 include a plurality of laminated steel plates. The laminated steel plates 10 are laminated in such a way that the holes provided in the respective steel plates are positioned in the same position in the laminating direction of the steel plates (vertical direction shown in FIG. 2). Further, FIG. 2 shows a state in which a magnet 14 is inserted into the magnet hole 11c. The magnet 14 is formed so that the width of the magnet 14 is somewhat smaller than the width of the magnet hole 11c (distance in the lateral direction in FIG. 2). According to the resin molding method and the resin molding apparatus according to the first embodiment, a gap formed between the magnet hole 11c and the magnet 14 in FIG. 2 is filled with resin.

Figure 3:
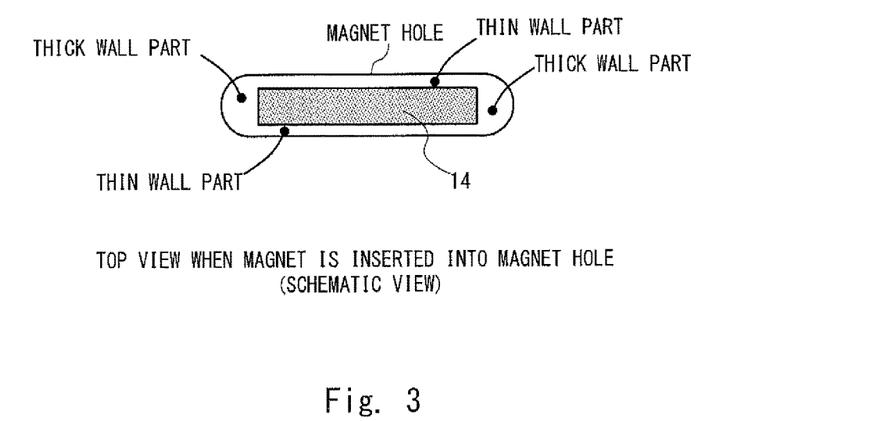
FIG. 3 is a schematic view of a top view of a magnet hole of the rotor core in a state in which a magnet is inserted into the magnet hole of the rotor core according to the first embodiment.

Next, FIG. 3 shows a schematic view of a top view of the magnet hole of the rotor core 1 in a state in which the magnet 14 is inserted into the magnet hole of the rotor core 1 according to the first embodiment. In the magnet holes 11a to 11c of the rotor core 1 according to the first embodiment, a space which serves as a channel for softened thermosetting resin in the rotor core is provided in a position adjacent to the part in which the magnet 14 is inserted. In FIG. 3, a gap between the magnet 14 and a wall of the magnet hole in the lateral direction of the magnet 14 serves as a channel for the thermosetting resin in the rotor core. In the following description, a space which serves as the channel for the thermosetting resin in the rotor core is referred to as a thick wall part.

Further, in the rotor core 1 according to the first embodiment, a space between the magnet 14 and a wall of the magnet hole is provided in positions which are over and under the magnet 14 in FIG. 3. In the following description, a space between the magnet 14 and the wall of the magnet hole positioned over and under the magnet 14 is referred to as a thin wall part.

Figure 4:
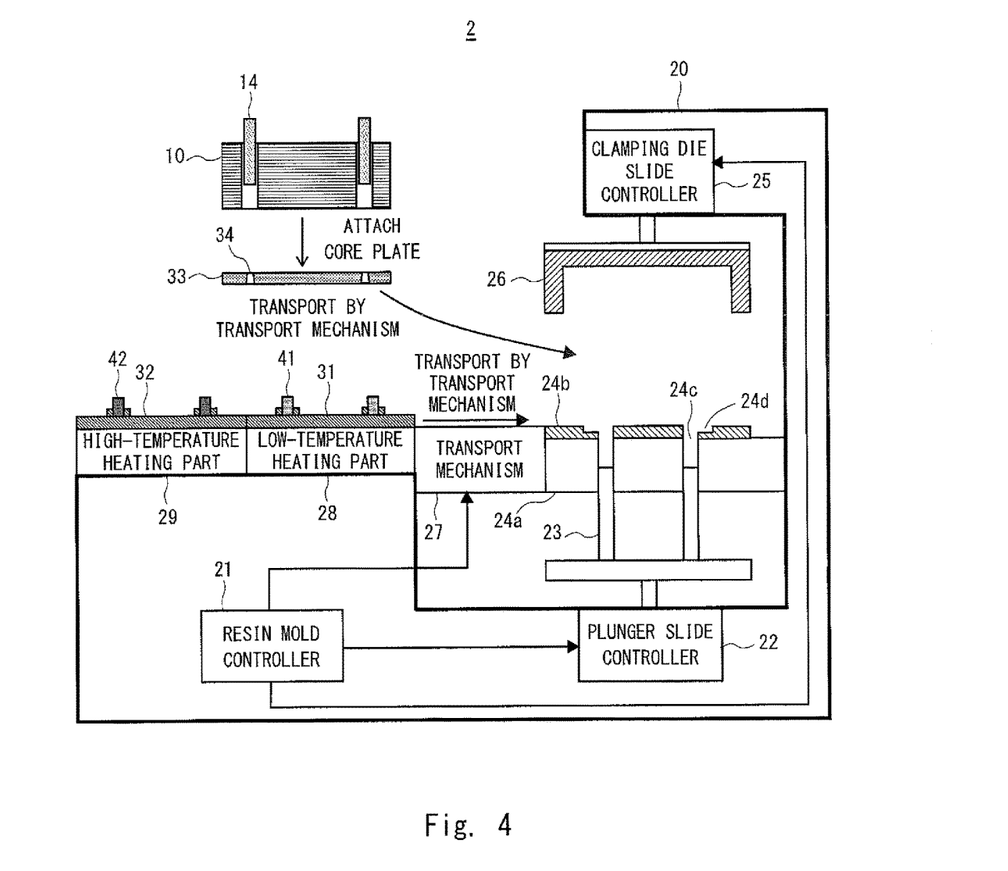
FIG. 4 is a schematic view of a resin molding apparatus according to the first embodiment.

Next, the resin molding apparatus 2 according to the first embodiment will be described. FIG. 4 shows a schematic view of the resin molding apparatus 2 according to the first embodiment. As shown in FIG. 2, the resin molding apparatus 2 includes a case 20 that includes a plurality of function units. The resin molding apparatus 2 according to the first embodiment includes a resin mold controller 21, a plunger slide controller 22, a plunger 23, a molding die, a clamping die slide controller 25, a clamping die 26, a transport mechanism 27, a first tablet heating part (e.g., low-temperature heating part 28), and a second tablet heating part (e.g., high-temperature heating part 29).

The resin mold controller 21 controls the plunger slide controller 22, the clamping die slide controller 25, and the transport mechanism 27 in a predetermined sequence. The details of the control sequence of the resin mold controller 21 will be described later.

The plunger slide controller 22 slides the plunger that slides in the pot based on an instruction from the plunger slide controller 22. The plunger 23 slides in the pot 24c provided in the molding die and pushes up the thermosetting resin injected into the pot 24c. The molding die includes a base die 24a, a runner plate 24b, a pot 24c, and a channel 24d. The base die 24a is fixed to the case 20. Further, the pot 24c is formed in the base die 24a. A heater that heats a resin tablet to soften the thermosetting resin is incorporated in a side wall of the pot 24c. The runner plate 24b is fixed to the upper part of the base die 24a. The channel 24d is provided in the runner plate 24b. Further, a heater that heats the thermosetting resin is incorporated in the runner plate 24b. The channel 24d serves as a channel for the thermosetting resin that has been softened. In the resin molding apparatus 2 according to the first embodiment, the opening of the pot 24c and a part of the opening of the channel are formed in the same position and the resin tablet can be injected into the pot 24c even in a state in which the runner plate 24b is attached to the upper part of the base die 24a. By forming the molding die as stated above, it is possible to repeatedly use the runner plate 24b and to easily exchange the runner plate 24b.

The clamping die slide controller 25 slides the clamping die based on an instruction from the resin mold controller 21. The clamping die 26 pushes the workpiece against the molding die. In the resin molding apparatus 2 according to the first embodiment, a heater is incorporated in the clamping die 26 to add heat to the workpiece to heat the thermosetting resin.

The transport mechanism 27 transports resin tablets heated by the low-temperature heating part 28 and the high-temperature heating part 29 to the pot 24c of the molding die. Further, the transport mechanism 27 transports the laminated steel plates 10 to which a core plate 33 is attached onto the molding die. The transport mechanism 27 carries out this transport operation according to an instruction by the resin mold controller 21. The specific transport means of the transport mechanism 27 is employed as appropriate according to the object transported by means such as a robot arm, a belt conveyor or the like.

The low-temperature heating part 28 heats the resin tablet to a first temperature. In the resin molding apparatus 2 shown in FIG. 4, the tablets arranged on a palette 31 are placed on the low-temperature heating part 28. The tablet heated to the first temperature is referred to as a first tablet 41. The high-temperature heating part 29 heats the resin tablet to a second temperature higher than the first temperature. In the resin molding apparatus 2 shown in FIG. 4, the tablets arranged on a palette 32 are placed on the high-temperature heating part 29. The tablet heated to the second temperature is referred to as a second tablet 42. The preheating temperature of the first tablet is adjusted so that resin has a sufficient fluidity to prevent a state in which resin starts to be thermally cured and the viscosity of resin becomes too high when the resin melted in the pot 24c is pushed out by the plunger 23 and starts to be injected into the magnet hole 11. The preheating temperature of the first tablet is set to about 50° C. On the other hand, since the second tablet is melted and is injected into the magnet hole 24c first, the temperature of the second tablet is adjusted to be higher than the temperature of the first tablet. The preheating temperature of the second tablet is adjusted to about 70° C. so that the second tablet is melted to some extent, and resin has sufficient fluidity, before the molten resin starts to be pushed out by the plunger 23. When the preheating temperature of the second tablet is too high, the tablet expands more than the pot hole diameter and it is difficult for the tablet to enter the pot 24c or the tablet becomes too soft to keep its shape while it is being injected into the pot 24c. The preheating temperature needs to be set to avoid such situations. It is necessary to make the timing when resin in the upper part of the pot is melted adequately different from the timing when resin in the lower part of the pot is melted at the stage of pushing out molten resin from the pot 24c. That is, molten resin pushed out from the pot 24c in the later stage is adequately melted later than upper resin pushed out first. While the preheating temperature of the first and second tablets may vary depending on the type of resin to be used and the ability to heat the pot 24c, the difference in preheating temperature between the first tablet and the second tablet is preferably equal to or larger than 20° C.

FIG. 4 also shows the core plate 33 attached to the laminated steel plates 10. A gate that connects the magnet hole of the laminated steel plates 10 and the channel 24d provided in the runner plate 24b is provided in the core plate 33. In the resin molding apparatus 2 according to the first embodiment, the laminated steel plates 10 to which the core plate 33 is attached is placed on the molding die and the rotor core 1 is filled with thermosetting resin.

Figure 5:
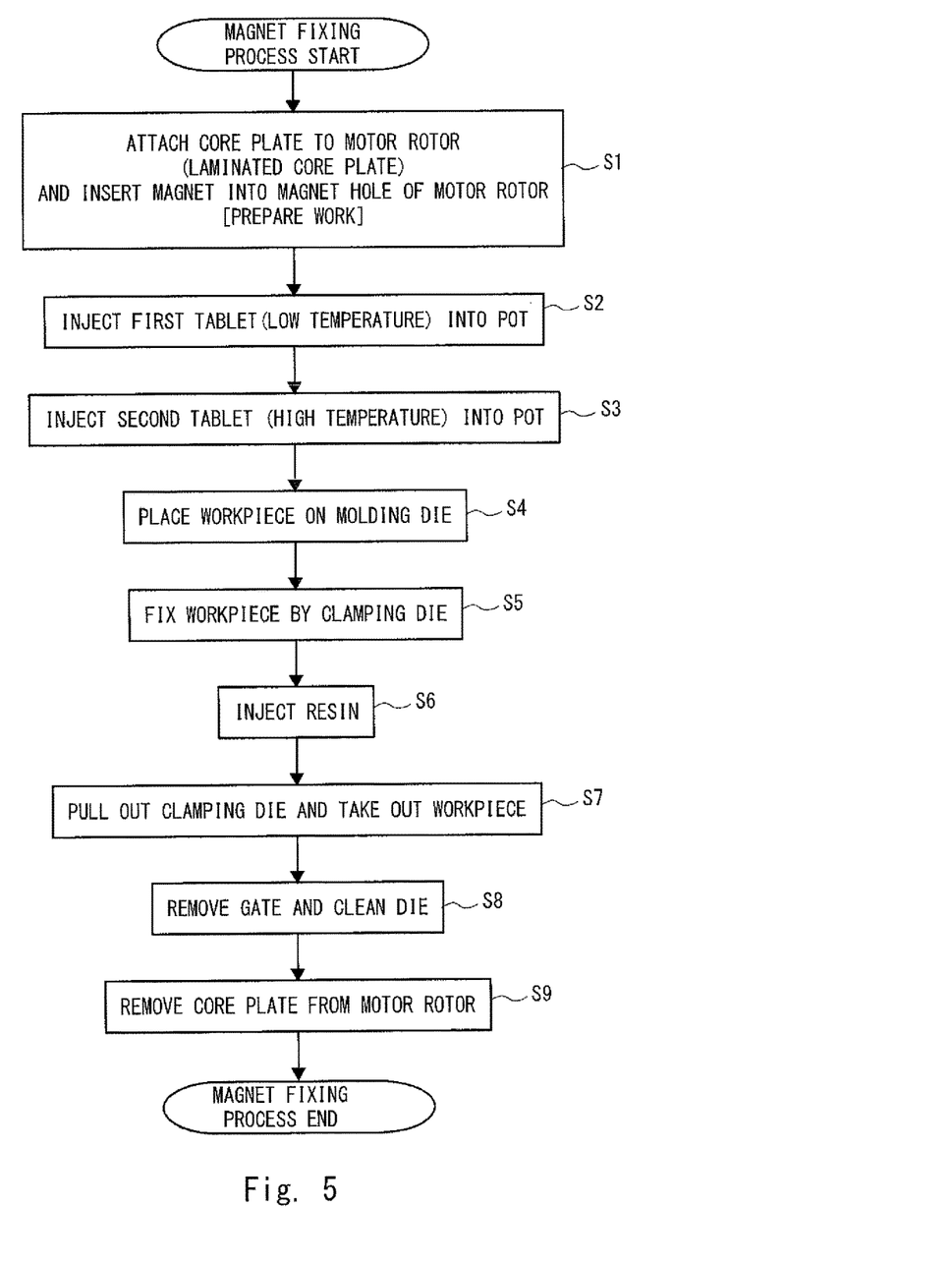
FIG. 5 is a flowchart for describing an order of a resin molding method according to the first embodiment.

Next, an operation of the resin molding apparatus 2 and the resin molding method according to the first embodiment will be described in detail. FIG. 5 shows a flowchart for describing the order of the resin molding method according to the first embodiment.

As shown in FIG. 5, in the resin molding method according to the first embodiment, first, as a preparation of the workpiece, the attachment of the core plate 33 to the rotor core 1 and the insertion of the magnet 14 into the magnet hole of the rotor core 1 are performed (Step S1). Next, the low-temperature tablet (e.g., first tablet 41) heated by the low-temperature heating part 28 is injected into the pot 24c (Step S2). Next, the high-temperature tablet (e.g., second tablet 42) heated by the high-temperature heating part 29 is injected into the pot 24c.

Next, the rotor core 1 (e.g., workpiece) to which the core plate 33 is attached is placed on the molding die (Step S4). After that, the workpiece that has been placed on the molding die is pushed against the molding die by the clamping die 26 to fix the workpiece (Step S5). Next, the thermosetting resin is injected into the magnet hole of the rotor core 1 by the plunger 23 in the order of the second tablet 42 and the first tablet 41 (Step S6).

Next, in response to the completion of the injection of the thermosetting resin into the magnet hole and thermal cure, the clamping die 26 is pulled up and the workpiece is taken out (Step S7). Next, runners remaining in the channel 24*d* are removed and the molding die is cleaned (Step S8). The core plate 33 is then removed from the rotor core 1 (Step S9) and the process of fixing the magnet is ended.

In the resin molding apparatus 2 according to the first embodiment, the sequence to carry out the above procedure is set in the resin mold controller 21. The resin mold controller 21 outputs an instruction of each controller at a predetermined timing in the process to carry out the above procedure.

Specifically, the resin mold controller 21 instructs the transport mechanism 27 to inject the first tablet 41 and the second tablet 42 into the pot 24*c* in such a way that the second tablet 42 is positioned closer to the workpiece than the first tablet 41 is in the pot 24*c*. Further, the resin mold controller 21 instructs the transport mechanism 27 to place the workpiece in which the core plate 33 is attached to the rotor core 1 on the molding die after the first tablet 41 and the second tablet 42 are transported into the pot 24*c*. Further, the resin mold controller 21 instructs the clamping die slide controller 25 to push the workpiece against the molding die after the workpiece is provided in the molding die. Further, the resin mold controller 21 instructs the plunger slide controller 22 to pour thermosetting resin into the magnet hole of the workpiece by pushing out the plunger after the workpiece is pushed against the molding die.

Further, the resin mold controller 21 instructs the transport mechanism 27 to take out the workpiece after the injection of the thermosetting resin and instructs the plunger slide controller 22 to push up the plunger to remove culls (remainder materials).

Figure 6:
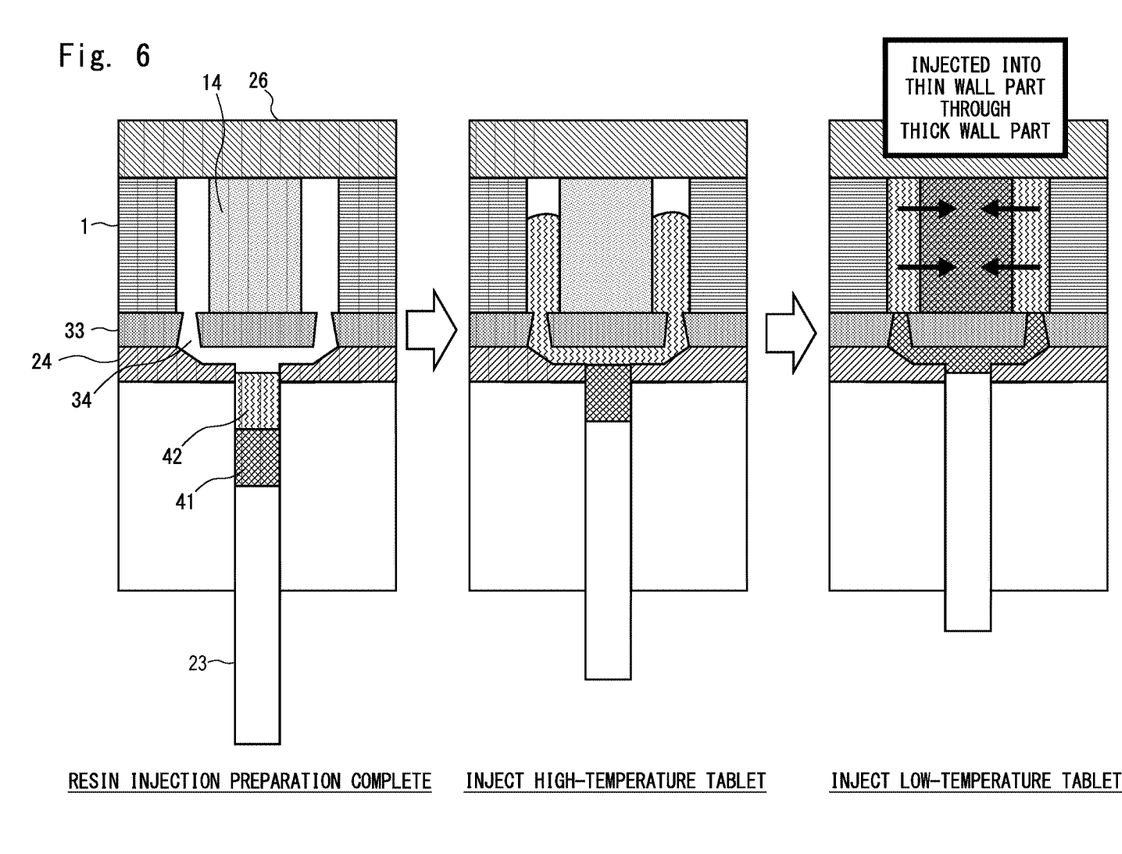
FIG. 6 is a diagram for describing a resin filling process in the resin molding method according to the first embodiment.

The process of injecting the resin in the resin molding method according to the first embodiment will be described further in detail. FIG. 6 shows a diagram for describing a resin filling process in the resin molding method according to the first embodiment. FIG. 6 is a cross-sectional view of the magnet hole in the longitudinal direction when the magnet hole is seen from the top side. FIG. 6 shows three diagrams for describing the resin filling process. In FIG. 6, the filling process proceeds from the left to the right of the drawing.

As shown in FIG. 6, in the resin molding method according to the first embodiment, the second tablet 42 that is heated to a high temperature is injected into a position close to the workpiece in the pot, and the first tablet 41 heated to a low temperature is injected into a position far from the workpiece in the pot. The first tablet 41 and the second tablet 42 are softened once after they are heated by the pot, the core plate 33, and the rotor core 1, respectively, and are cured after they are further heated.

When the plunger slide controller 22 pushes up the plunger 23, the part of the second tablet 42 that is melted is first injected into the rotor core 1. The second tablet 42 is sufficiently softened at the time of the injection and is gradually hardened by the heating in the injection process. On the other hand, the first tablet 41 is not sufficiently softened at the time when the part of the second tablet 42 that is melt starts to be injected and is softened as the injection process advances.

The injection of the molten resin of the first tablet 41 melted later is started when the injection of the second tablet 42 is ended. At the time when the injection of the molten resin of the first tablet 41 is started, the first tablet 41 is sufficiently softened. Further, resin of the second tablet 42 is gradually cured in the magnet hole. When the molten resin of the first tablet 41 is injected into the magnet hole in this state, the molten resin of the first tablet 41 is injected in such a way that the molten resin enters the gap between the wall surface of the magnet hole and the magnet which the resin of the second tablet 42 does not sufficiently fill. This is because the curing reaction is retarded since the initial temperature of molten resin of the first tablet 41 injected later is set to be lower than that of the molten resin of the second tablet 42 injected first, and the first tablet 41 is injected into the magnet hole 11 in a state in which the viscosity is low.

Figure 7:
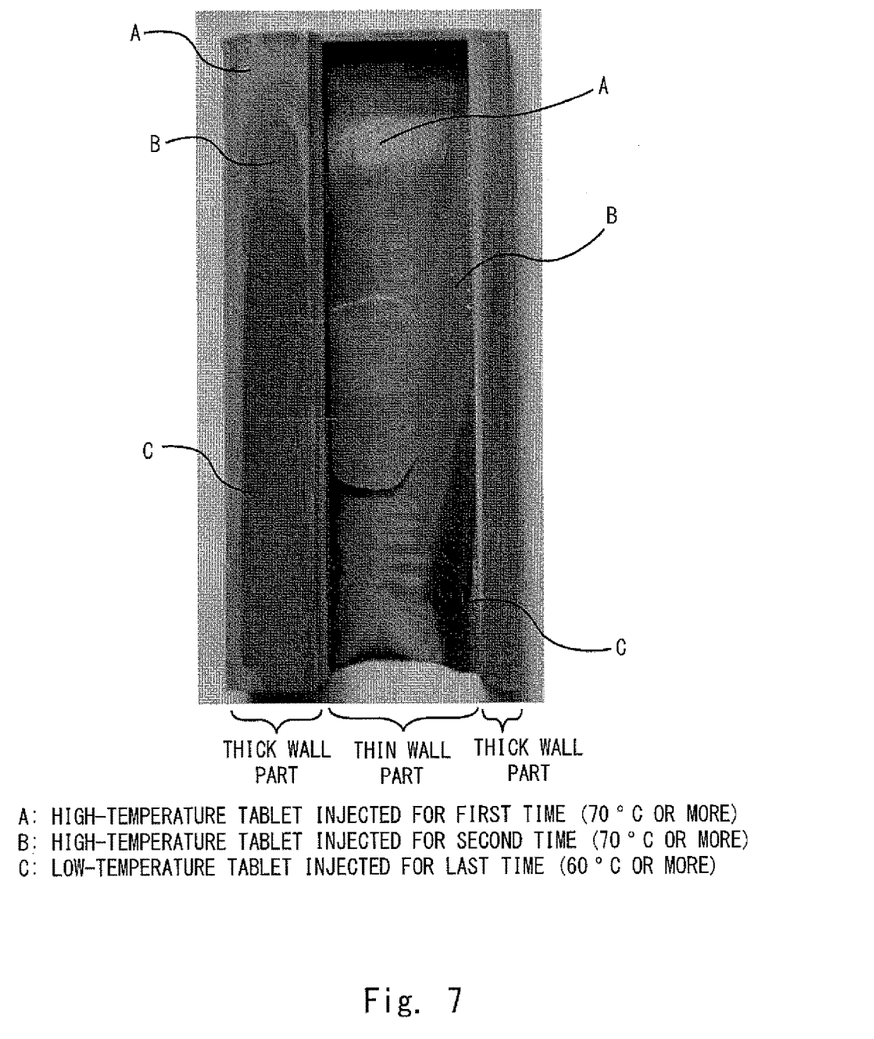
FIG. 7 is a diagram for describing a resin filling experiment in the resin molding method according to the first embodiment.

Now, results of the above injection process confirmed by an experiment will be described. FIG. 7 shows a diagram for describing a resin filling experiment in the resin molding method according to the first embodiment. In the experiment shown in FIG. 7, three-color resin tablets are used, and the resin tablets injected into the magnet hole for the first and second time are heated to 70° C. or more and the resin tablet injected into the magnet hole for the last time is heated to about 60° C. In FIG. 7, the color of the tablet A injected into the magnet hole for the first time is expressed by the lightest color, the color of the tablet C injected into the magnet hole for the last time is expressed by the darkest color, and the color of the tablet B injected into the magnet hole for the second time is expressed by a color intermediate between the colors of the two tablets.

As shown in FIG. 7, when the thermosetting resin is injected into the magnet hole, the thermosetting resin that has been injected first reaches the deepest part of the magnet hole and the thermosetting resin that has been injected later is cured in a position near the inlet thereof. Further, the thermosetting resin that has been injected later also reaches the thin wall part. This means that there is a probability that, when the curing of the thermosetting resin that has been injected later has been progressing, the resin may stop at the thick wall part and the thin wall part is not sufficiently filled with resin. It will be understood, however, from the results of the experiment shown in FIG. 7 that by the application of the resin molding method according to the first embodiment, the thin wall part is also sufficiently filled with resin.

From the above description, according to the resin molding method and the resin molding apparatus 2 according to the first embodiment, it is possible to delay the timing when the thermosetting resin injected into the hole later starts to be cured. Accordingly, by the use of the resin molding method and the resin molding apparatus 2 according to the first embodiment, the thin wall part, which is a narrow space, can be sufficiently filled with resin.

Further, when the volume of the space to be filled with resin is large, the viscosity of the thermosetting resin injected into the space later may increase at a timing when the thermosetting resin is injected into the space and the space may not be sufficiently filled with resin. However, according to the resin molding method and the resin molding apparatus 2 according to the first embodiment, it is possible to delay the timing when the thermosetting resin injected into the hole later starts to be cured. Accordingly, by the use of the resin molding method and the resin molding apparatus 2 according to the first embodiment, it is possible to definitely fill the space with resin having a large capacity.

Further, in the resin molding method and the resin molding apparatus 2 according to the first embodiment, the viscosity of the thermosetting resin can be kept low even after the resin injection process is completed, whereby it is possible to improve the accuracy with which an object to be filled with resin having a narrow and complicated-shape space is filled with resin.

Further, when the laminated steel plates are employed as the workpiece, the wall surface of the magnet hole provided in the laminated steel plates may have irregularities. Therefore, when the magnet 14 is inserted into the magnet hole provided in the laminated steel plates, a narrow space tends to be easily formed. From the above description, when the resin molding method and the resin molding apparatus 2 according to the first embodiment are used to fill the rotor core 1 formed of the laminated steel plates with resin, it is possible to greatly improve the accuracy with which the rotor core 1 is filled with resin.

It has been confirmed from the experiment conducted by the present inventors that the excellent filling properties can be obtained when the difference in temperature between the second tablet 42 injected first and the first tablet 41 injected later is 20° C. or higher. Further, it is preferable that the temperature of the second tablet 42 injected first be around 70° C. so that the tablet does not expand very much. It is possible to reduce time required to start filling by heating the resin tablet and reduce the cycle time of the resin filling process. It has been confirmed from the experiment conducted by the present inventors that the most effective way to reduce cycle time is to set the temperatures to the above temperatures.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A resin molding method that fills a space between an insertion hole provided in a workpiece and a member to be fixed inserted into the insertion hole with resin, the method comprising:
    injecting a first tablet formed of thermosetting resin preheated to a first temperature into a position of a pot far from the workpiece, the pot pouring the resin into the workpiece and being provided in a molding die,
    injecting a second tablet formed of thermosetting resin preheated to a second temperature higher than the first temperature into a position of the pot closer to the workpiece than the position at which the first tablet is injected; wherein:
    the first tablet is softened less than the second tablet at the time when a part of the second tablet that is melted starts to be injected into the insertion hole,
    the first tablet is softened as an injection process in which the second tablet is injected into the insertion hole advances, and
    after the second tablet is injected into the insertion hole, the first tablet that has been softened starts to be injected into the insertion hole.

2. The resin molding method according to claim 1, wherein a difference between the first temperature and the second temperature is 20° C. or higher.

* * * * *